United States Patent [19]

McNabb et al.

[11] Patent Number: 5,820,787
[45] Date of Patent: Oct. 13, 1998

[54] PROCESS FOR DUST SUPPRESSION IN SOLIDS

[75] Inventors: Andrew J. McNabb, Lake Jackson, Tex.; Teresa C. Webb, Leicester, N.C.

[73] Assignee: BASF Corporation, Mt. Olive, N.J.

[21] Appl. No.: 837,513

[22] Filed: Apr. 14, 1997

[51] Int. Cl.$^6$ .................................................. C09K 3/22
[52] U.S. Cl. .................. 252/384; 252/351; 252/381; 252/88.1
[58] Field of Search .................................. 252/351, 381, 252/384, 88.1

[56] References Cited

U.S. PATENT DOCUMENTS

| | | | |
|---|---|---|---|
| 1,266,212 | 5/1918 | Capron | 23/119 |
| 1,919,707 | 7/1933 | Adam et al. | |
| 2,043,067 | 6/1936 | Rumscheidt et al. | 23/119 |
| 2,092,073 | 9/1937 | Jeltsch et al. | 23/119 |
| 2,099,079 | 11/1937 | Rumscheidt et al. | 23/119 |
| 2,102,107 | 12/1937 | Berkhoff, Jr. | 23/119 |
| 2,178,082 | 10/1939 | Rayner | 23/119 |
| 2,226,101 | 12/1940 | Ogden | 23/119 |
| 2,228,742 | 1/1941 | Applebey | 23/119 |
| 2,368,901 | 2/1945 | Tiddy | 23/119 |
| 2,423,794 | 7/1947 | Otto | 23/119 |
| 2,424,207 | 7/1947 | Otto | 23/119 |
| 2,599,067 | 6/1952 | Otto | 23/119 |
| 2,631,084 | 3/1953 | Robinson | 23/119 |
| 2,659,659 | 11/1953 | Schmidl | 23/119 |
| 2,782,097 | 2/1957 | Costolow | 23/119 |
| 2,795,487 | 6/1957 | Otto | 23/273 |
| 2,805,125 | 9/1957 | Van Ackeren | 23/119 |
| 2,874,028 | 2/1959 | Ponchaud | 23/119 |
| 2,895,800 | 7/1959 | Otto | 23/119 |
| 3,393,973 | 7/1968 | Almy | 23/89 |
| 3,600,818 | 8/1971 | Lang | 34/10 |
| 3,794,099 | 2/1974 | Ganiaris | 159/48 R |
| 4,057,396 | 11/1977 | Makovich | 23/252 R |
| 4,141,316 | 2/1979 | Grun | 118/303 |
| 4,242,307 | 12/1980 | Fally | 117/204 |
| 4,277,253 | 7/1981 | Walter et al. | 23/313 R |
| 4,332,933 | 6/1982 | DiDrusco et al. | 422/139 |
| 4,435,341 | 3/1984 | Bechtold | 264/7 |
| 4,698,913 | 10/1987 | Voll | 34/10 |
| 4,715,555 | 12/1987 | Newman et al. | 423/268 |
| 4,741,807 | 5/1988 | Wilhelm et al. | 196/14.52 |
| 4,859,315 | 8/1989 | Bartholic | 208/153 |
| 5,032,143 | 7/1991 | Ritakallio | 23/313 |
| 5,041,153 | 8/1991 | Detroit | 71/25 |
| 5,075,138 | 12/1991 | Tanaka et al. | 427/213 |
| 5,120,345 | 6/1992 | Kayaert et al. | 71/30 |
| 5,330,544 | 7/1994 | Thomson et al. | 23/313 |
| 5,408,953 | 4/1995 | Thomson et al. | 117/206 |

FOREIGN PATENT DOCUMENTS

| | | |
|---|---|---|
| 980596 | 12/1975 | Canada . |
| 179538 | 7/1979 | Czechoslovakia . |
| 0255665 | 2/1988 | European Pat. Off. . |
| 0320987 | 6/1989 | European Pat. Off. . |
| 670299 | 9/1995 | European Pat. Off. . |
| 1578057 | 7/1969 | France . |
| 100735 | 10/1973 | Germany . |
| 218089 | 1/1985 | Germany . |
| 61-256917 | 11/1986 | Japan . |
| 62-46920 | 2/1987 | Japan . |
| 2019535 | 9/1994 | Russian Federation . |
| 919994 | 4/1982 | U.S.S.R. . |
| 1169966 A | 7/1985 | U.S.S.R. . |
| 1381480 | 1/1975 | United Kingdom . |
| 9118059 | 11/1991 | WIPO . |

OTHER PUBLICATIONS

Parkash, "Residence Times of Crystals in a Fluidised Bed Crystallizer", *Chemistry and Industry*, pp. 919–920, 1967.
Parkesh et al., "Crystal Growth in Fluidized Beds", *Indian Chemical Engineer*, Jan. 1968, pp. 3–6.
Vragov, "Investigation of Ammonium Sulfate Crystallization in a Pseudo Liquified Layer", *Sb. Nauch, Tr., Kuzbas, Politekh. Int.*, No. 26, 1970.
Postnikov et al., "Crystallization of Ammonium Sulfate in a Two–Circuit Device with a Circulating Suspension", *Koksii Khimiya*, No. 4, 1983, pp. 24–27.
GALORYL ATH 632 Product Bulletin, Lobeco Products Inc. 1994.

*Primary Examiner*—Shean C. Wu

[57] ABSTRACT

Solid materials are treated with a blend of water or solvents and distillation bottoms obtained from production of an alcohol having the formula:

R2—R1—OH, wherein R1 is substituted or unsubstituted, branched, straight chain, or cyclic $C_4$ to $C_{12}$ and R2 is OH or H.

10 Claims, No Drawings

PROCESS FOR DUST SUPPRESSION IN SOLIDS

FIELD OF THE INVENTION

The present invention relates generally to solid state materials and it has particular application for suppressing dust formation in solid state fertilizers.

BACKGROUND OF THE INVENTION

The generation of dust in the handling of certain finely divided solid materials or in the handling of "fines" present among larger particles, is a known problem. One area where this problem has been observed is in the handling of fertilizer materials. Dust is frequently generated in the handling of dry fertilizers. Dust can be a nuisance and may pose safety and health hazards. Dust problems are particularly severe in bulk fertilizer production and in distribution facilities that handle large quantities of dry fertilizers. When loading or unloading large quantities of such materials, the dust generated results in poor working conditions. A portion of the solid is lost and the surrounding may be contaminated with the settling dust. The United States Government has issued regulations to control dust exposure in the work place and to limit the amount of dust released into the environment.

The problem of preventing dust formation has been handled by spraying a liquid onto the solid material. Examples of this may be found in U.S. Pat. No. 3,393,973, to Almy, (tall oil sprayed on potash); U.S. Pat. No. 4,717,555 to Newman, et al. (naphthalene sulfonates and water on ammonium salts preventing caking and dust formation); and U.S. Pat. No. 5,041,153 to Detroit (lignosulfonate treated inorganic chemicals resist caking and dust).

Waxes and oils have also been applied to fertilizer powders to prevent dust formation. Such is described in European Patent Publication 0 255 665.

Russian Inventor's Certificate 2019535 C1 describes the use of glycerol residuum (bottoms formed in the distillation of crude glycerol) applied to potassium chloride as an anti-dusting agent.

Ammonium sulfate has been granulated to improve particle size distribution. U.S. Pat. No. 4,277,253 to Walter et al. describes the granulation of ammonium sulfate and other fertilizer ingredients.

Lobeco Products Inc. offers an anti-caking and anti-dusting product under the name Galoryl™ ATH 632. Galoryl ATH 632 is a solid at ambient temperature and must be heated (to about 80° C.) to the liquid state before application. This adds to the handling difficulty and contributes to the safety precautions that must be in place to prevent burns from spillage of heated liquids.

In addition to the handling difficulties, such sprays are expensive and add significantly to the production cost of free-flowing, dust-free granules. Therefore, there remains a need for safely and economically producing granules that remain free-flowing and dust-free even after storage and shipping.

Water is an effective anti-dusting agent. Water, however, usually causes the material, e.g., ammonium sulfate, to cake. An effective anti-dusting agent will not contribute to the caking problems observed with many of the solid materials to which the present invention relates.

SUMMARY OF THE INVENTION

Accordingly, it is an object of the present invention to provide granules, like ammonium sulfate, that are substantially dust-free.

It is a further object of the present invention to provide a process for making granules that are substantially dust-free.

Another object of the present invention is to provide granules that are substantially dust-free and do not tend to cake on storage and shipment.

These and related objects and advantages are met in a process for suppressing dust formation of solids by treating the solids with a blend of water or other solvents. The distillation bottoms are liquid at about 60° C. or less and are obtained from production of an alcohol having the formula:

$$R2\text{—}R1\text{—}OH,$$

wherein R1 is substituted or unsubstituted, branched, straight chain, or cyclic $C_4$ to $C_{12}$ and R2 is OH or H. The preferred distillation bottoms are distillation bottoms from the production of 1,6 hexanediol. The blend may be up to about 50% by weight water. The solid may be any solid that has a tendency to form dust on storage, shipment or use. When the solid is a fertilizer, it may be potassium chloride; potassium nitrate; potassium chloride; and ammonium sulfate; ammonium nitrate; sodium nitrate; potassium nitrate; calcium nitrate; urea; diammonium phosphate; ammonium polyphosphate; monoammonium phosphate; triple superphosphate; ammonium chloride; potash; or mixtures of thereof. Others solids, however are made dust free through the use of the present invention. The preferred application rate is generally about 2 to about 40 lb./ton solid.

In addition, the present invention includes treating solids that are in the form of unpaved thoroughfares such as gravel parking lots and gravel or dirt roads to reduce dust formation due to vehicular traffic, etc.

Related objects and advantages will become apparent to those of ordinary skill in the art to which the invention pertains after reading the following detailed description of the invention.

DETAILED DESCRIPTION OF THE PREFERRED EMBODIMENTS

The invention will now be described with specific language. No limitation should be inferred due to the specific language. Reasonable modifications, equivalents and further embodiments, as will be readily envisioned by the ordinarily skilled in this art, are considered within the scope of the present invention.

The solids handling industry uses different terms to describe solids. "Powder" generally defines a very fine or dust-like material. "Granules" refer to larger particles that have more mass. "Particulate" is another term that is used. Agriculturists want to apply granular materials because they spread uniformly. Lighter materials are more difficult to spread uniformly on fields, especially on windy days. During the solids handling process, however, breakage occurs and dust or fines are generated. It should be understood in reading the following detailed description of the present invention that the term "granules" is not used in any limiting sense and applies to granular materials as well as fines, powders, particulate, combinations of these, etc.

One aspect of the present invention is a process for suppressing dust formation in the solid by applying to the solid, the distillation bottoms from the production of an alcohol having the formula:

$$R2\text{—}R1\text{—}OH,$$

wherein R1 is substituted or unsubstituted, branched, straight chain, or cyclic $C_4$ to $C_{12}$ and R2 is OH or H. Such distillation bottoms are diluted with water or other liquid and are in the liquid state at 60° C. or less. It is surprising that this by-product stream can be effectively used to suppress the tendency of solids to dust without promoting caking on storage and shipment.

The useful distillation bottoms (sometimes called "distillation heavies") are a by-product of the production of alcohols according to the formula:

R2—R1 OH, wherein R1 is substituted or unsubstituted, branched, straight chain, or cyclic $C_4$ to $C_{12}$ and R2 is OH or H. Preferably, the distillation bottoms are the by-product of the production of 1,6, hexanediol. While not wishing to be limited to the exact proportions of materials present in such bottoms, which may vary as will be understood by those ordinarily skill in the art, the following are exemplary components of 1,6 hexanediol distillation bottoms (in percent by weight determined by gas chromatography): 1,6 hexanediol (3.0–9.6), 6,6'dihydroxy-dihexyl ether (2.8–9.9), oligomers (11.5–14.0), various other diols, esters and ethers (73.6–76.8), and water (0.2–0.3). 1,6 hexanediol distillation bottoms is a dark liquid that freezes at about –54° C.

The present invention is applicable to a variety of granules that tend to dust. Such materials are found in many industries such as food, cosmetic, mining, sodium chloride, etc., industries. The reference to the fertilizer industry and fertilizer granules in this detailed description is, therefore, not considered to limit the present invention to the fertilizer industry. Exemplary granules include ammonium sulfate, ammonium nitrate, sodium nitrate, potassium nitrate, calcium nitrate, urea, diammonium phosphate, ammonium polyphosphate, monoammonium phosphate, triple superphosphate, ammonium chloride, potash, potassium chloride, potassium nitrate, potassium chloride and mixtures of these with other granules and with each other. Preferably, the granules are fertilizer granules and most preferably ammonium sulfate and mixtures thereof.

The distillation bottoms are preferably mixed with water or another equivalent solvent before application to the solid. As demonstrated in the Examples below, even when mixed with water prior to application, the distillation bottoms did not promote caking of ammonium sulfate fertilizer granules. Mixing with water may be preferred to reduce the viscosity of the distillation bottoms and make them more manageable in the field. The distillation bottoms may be diluted with up to about 50% (or more) by weight water. It should be noted that phase separation may occur at higher dilution levels (about 50%) but this is not considered detrimental to effectiveness in dust suppression.

The distillation bottoms may be applied by spraying directly on the granules or by other methods of application. Spraying is the currently preferred method. Spraying may be accomplished, for example, by pumping the dust suppressing agent through a spray nozzle which directs the dust suppressing agent on to the material to be treated. Various methods of pumping (i.e., types of pumps, use of a vapor pad to move the dust suppressing liquid, etc.) can be used as well as various types of nozzles (distributors, mixing drums, etc.). Many types of conventional and novel equipment can be used for this application. The dust suppressing agent should be applied in an approximately uniform layer on the treated material. It is preferably applied during the conveyance of the material into a storage container or the like. In some cases, the distillation bottoms may be heated before application, but this is not essential.

The rate of application will depend on the end use for which the solids are intended. In the case of fertilizers, the application rate is preferably in the range of about 2 pounds to about 40 pounds per ton of granules. More preferably, the application rate is about 4 pounds to about 12 pounds of distillation bottoms per ton of granules.

In addition, the distillation bottoms may be applied to unpaved thoroughfares, such as gravel parking lots, dirt roads and driveways, gravel roads and driveways, and other surfaces where dust formation is a problem. In the case of thoroughfares, application of the distillation bottoms will suppress dust formation due to traffic on such surfaces. The distillation bottoms may be applied by any conventional means for applying dust suppression agents to such surfaces. The distillation bottoms may or may not be mixed with water or an equivalent solvent.

Another aspect of the present invention is a substantially dust-free solid treated with the distillation bottoms from the production of an alcohol having the formula:

R2—R1—OH, wherein R1 is substituted or unsubstituted, branched, straight chain or cyclic $C_4$ to $C_{12}$ and R2 is OH or H. Such distillation bottoms are in the liquid state at about 60° C. or less. The useful distillation bottoms are described in more detail above in connection with the process aspect of the present invention. The preferred heavies are from the production of 1,6 hexanediol as described previously.

The treated solid of the present invention may be any one of a variety of granules that tend to create a substantial amount of dust. Such materials are found in many industries such as food, cosmetic, mining, sodium chloride, etc., industries. As noted in connection with the process of the present invention, the reference to the fertilizer industry and fertilizer granules in this detailed description is not considered to limit the present invention to the fertilizer industry. Exemplary granules include ammonium sulfate, ammonium nitrate, sodium nitrate, potassium nitrate, calcium nitrate, urea, diammonium phosphate, ammonium polyphosphate, monoammonium phosphate, triple superphosphate, urea, ammonium chloride, potash, potassium chloride, potassium nitrate, potassium chloride and mixtures of these with other granules and with each other. Preferably, the solid granules are fertilizer granules and, most preferably, ammonium sulfate and mixtures thereof.

To make the treated solid of the present invention, the distillation bottoms may be applied by spraying directly on the granules as described above in connection with the process. The distillation bottoms may be diluted up to about 50% by weight (or more) with water or another solvent. The rate of application is in the range of from about 2 pounds to about 40 pounds per ton of the solids to be treated. Preferably, the application is at a rate of about 4 to about 12 lb. distillation bottoms per ton of the solid to be treated.

The treated solid of the present invention may be an unpaved thoroughfare such as a parking lot, gravel road, dirt road, unpaved driveway, etc. The treated solid in the form of such a thoroughfare will resist dust formation from vehicular travel. The distillation bottoms may or may not be diluted with water or another solvent prior to treating the thoroughfare.

The invention will now be described in the following specific examples, however, no limitation on the scope of the invention should be inferred from the specific details of these examples. All percentages are by weight unless indicated to the contrary.

COMPARATIVE EXAMPLE

Untreated ammonium sulfate is conveyed from a production unit to a storage bin. Dust formation during conveyance is severe.

EXAMPLE 1

Dust Suppression

During conveyance from a production unit to a storage bin, ammonium sulfate is sprayed at a rate of about 1 gallon/ton (about 8 lb./ton) distillation bottoms from the production 1,6 hexanediol diluted with from about 10% to about 50% water. Dust formation is minimal.

EXAMPLES 2A–5B

Caking Test

In Examples 1–4, distillation bottoms from the production of 1,6 hexanediol are diluted with 15%, 20%, 25% and 30% water, respectively. For the "A" series of examples, the diluted bottoms are sprayed on ammonium sulfate granules at a rate of about 4 lb./ton. For the "B" series of examples, the diluted bottoms are sprayed on ammonium sulfate granules at a rate of about 8 lb./ton. An untreated ammonium sulfate sample is used as a control.

Test cakes are made from the treated ammonium sulfate and the untreated control. These cakes are made by placing ammonium sulfate in test cells and applying a pressure of 2 tons for one minute with a hydraulic press. A force gauge is used to record the force that is needed to break each cake. Five breaking tests are conducted for each example. The average force is reported in the table below.

TABLE

Cake Breaking Strength

| SAMPLE | BREAKING STRENGTH (lb.) |
| --- | --- |
| Control | 20 |
| 2A: 15% dilution @ 4 lb./ton | 12 |
| 2B: 15% dilution @ 8 lb./ton | 11 |
| 3A: 20% dilution @ 4 lb./ton | 14 |
| 3B: 20% dilution @ 8 lb./ton | 10 |
| 4A: 25% dilution @ 4 lb./ton | 15 |
| 4B: 25% dilution @ 8 lb./ton | 11 |
| 5A: 30% dilution @ 4 lb./ton | 13 |
| 5B: 30% dilution @ 8 lb./ton | 12 |

What is claimed is:

1. A process for suppressing dust formation of solids comprising:
    treating the solids with a blend of water and distillation bottoms from the production of 1,6 hexanediol.

2. The process of claim 1 wherein the blend is up to about 50% by weight water.

3. The process of claim 1 wherein said solid is selected from the group consisting of:
    ammonium sulfate;
    ammonium nitrate;
    sodium nitrate;
    potassium nitrate;
    calcium nitrate;
    urea;
    diammonium phosphate;
    ammonium polyphosphate;
    monoammonium phosphate;
    triple superphosphate;
    ammonium chloride;
    potash;
    potassium chloride;
    potassium nitrate;
    potassium chloride; and
    mixtures thereof.

4. The process of claim 3 wherein said solid is ammonium sulfate granules or a mixture thereof.

5. The process of claim 1 wherein said treating is by spraying said blend on the solid at a point where said solid is conveyed to storage.

6. The process of claim 5 wherein said spraying is at a rate of from about 2 to about 40 lb. distillation bottoms per ton solid.

7. The process of claim 6 wherein said spraying is at a rate of about 4 to about 12 lb. distillation bottoms per ton solid.

8. The process of claim 6 wherein said distillation bottoms are distillation bottoms from the production of 1,6 hexanediol and are sprayed on ammonium sulfate.

9. A process for suppressing dust formation on unpaved thoroughfares comprising:
    treating the unpaved thoroughfares with distillation bottoms from the production of 1,6 hexanediol.

10. The process of claim 9 wherein said thoroughfares are one or more gravel roads, dirt roads, gravel driveways, dirt driveways or unpaved parking lots.

* * * * *